United States Patent
Kozlowski et al.

(10) Patent No.: US 11,451,035 B2
(45) Date of Patent: Sep. 20, 2022

(54) WIRING CLIPS FOR SECURING CONDUCTORS TO A FRAMING MEMBER

(71) Applicant: ERICO INTERNATIONAL CORPORATION, Solon, OH (US)

(72) Inventors: Daniel A. Kozlowski, North Canton, OH (US); Jeffrey A. Wilson, Cuyahoga Falls, OH (US); Scott E. Anderson, Garrettsville, OH (US)

(73) Assignee: ERICO International Corporation, Solon, OH (US)

( * ) Notice: Subject to any disclaimer, the term of this patent is extended or adjusted under 35 U.S.C. 154(b) by 348 days.

(21) Appl. No.: 16/799,081

(22) Filed: Feb. 24, 2020

(65) Prior Publication Data

US 2020/0274342 A1    Aug. 27, 2020

Related U.S. Application Data

(60) Provisional application No. 62/809,859, filed on Feb. 25, 2019.

(51) Int. Cl.
*H02G 3/30* (2006.01)
*F16M 13/02* (2006.01)

(52) U.S. Cl.
CPC ............ *H02G 3/30* (2013.01); *F16M 13/02* (2013.01)

(58) Field of Classification Search
CPC ........ H02G 3/123; H02G 3/125; H02G 3/126; H02G 3/32; H02G 3/30; H02G 3/26; H02G 3/0456; H02G 1/08; H02G 3/24; F16L 3/13; F16L 3/137; F16L 3/233; F16L 3/06
See application file for complete search history.

(56) References Cited

U.S. PATENT DOCUMENTS

| | | | |
|---|---|---|---|
| 3,528,636 A | | 9/1970 | Schmidt |
| 3,553,423 A | * | 1/1971 | Doxey ................. B23K 9/1336 226/97.1 |
| 3,684,230 A | * | 8/1972 | Swanquist ............. H02G 3/125 220/3.9 |
| 3,730,466 A | * | 5/1973 | Swanquist ............. H02G 3/125 220/3.9 |
| 3,780,209 A | | 12/1973 | Schuplin |
| 3,804,359 A | | 4/1974 | Cumber |

(Continued)

FOREIGN PATENT DOCUMENTS

| | | |
|---|---|---|
| CA | 2040739 A1 | 1/1992 |
| EP | 1180838 A1 | 2/2002 |
| WO | 2013122904 A1 | 8/2013 |

OTHER PUBLICATIONS

NVent Snap to Stud Cable Support, Screwless product sheet, Copyright 2020 nVent, 1 page.

(Continued)

*Primary Examiner* — Krystal Robinson
(74) *Attorney, Agent, or Firm* — Quarles & Brady LLP

(57) ABSTRACT

A wiring clip is provided for securing one or more conductors to a stud. The wiring clip can include a support portion configured to engage the one or more wires and an attachment portion that at least partly defines an inner recess that can be configured to receive the stud. The attachment portion can be configured to secure the wiring clip to the stud without the use of separate fasteners, including through selectively engagement of hooks of the attachment portion with open or closed sides of the stud.

20 Claims, 13 Drawing Sheets

(56) References Cited

U.S. PATENT DOCUMENTS

| | | |
|---|---|---|
| 4,362,284 A | 12/1982 | Bolante |
| 4,971,280 A | 11/1990 | Rinderer |
| 5,004,199 A | 4/1991 | Suk |
| 5,141,185 A | 8/1992 | Rumbold et al. |
| 5,188,318 A | 2/1993 | Newcomber et al. |
| 5,408,045 A | 4/1995 | Jorgensen et al. |
| 5,587,555 A | 12/1996 | Rinderer |
| 6,389,658 B1 | 5/2002 | Pfaller et al. |
| 7,073,757 B2 | 7/2006 | Johnson et al. |
| 7,208,680 B2 | 4/2007 | Drane |
| 7,219,863 B1 | 5/2007 | Collett, II |
| 7,250,571 B2 | 7/2007 | Magno |
| 7,360,745 B2 | 4/2008 | Nikayin et al. |
| 8,079,561 B2 | 12/2011 | Jarafi |
| 8,262,043 B2 | 9/2012 | Jafari |
| 8,746,633 B1 * | 6/2014 | Medlin, Jr. ............. H02G 3/32 248/65 |
| 8,770,526 B2 * | 7/2014 | Siddiqui ................ H02G 3/125 248/200.1 |
| 9,010,696 B2 | 4/2015 | Siddiqui et al. |
| 9,261,120 B2 | 2/2016 | Colangelo et al. |
| 9,562,628 B2 | 2/2017 | Nuernberger |
| 2005/0011996 A1 * | 1/2005 | Geater .................... H02G 3/30 248/316.1 |
| 2006/0130286 A1 * | 6/2006 | Igarashi ................ F16L 3/2334 24/17 A |
| 2007/0057130 A1 * | 3/2007 | Nikayin ................ H02G 3/126 248/216.1 |
| 2008/0142646 A1 | 6/2008 | Magno et al. |
| 2011/0001026 A1 | 1/2011 | Kubsad et al. |

OTHER PUBLICATIONS

NVent CJ6STS Snap to Stud Cable Support instruction sheet, Copyright 2019 nVent, 2 pages.
Erico CJ6 & CJ6S Colorado Jim Cable Support instruction sheet, Copyright 2008 Erico International Corporation, 2 pages.
Eaton's B-Line series fasteners, Staple-Lok Multi-Purpose Cable Support; product sheet, not dated, 1 page.
Eaton B-Line Series Fasteners, BRC6M cable support, product sheet, Copyright 2015 Eaton, 1 page.

* cited by examiner

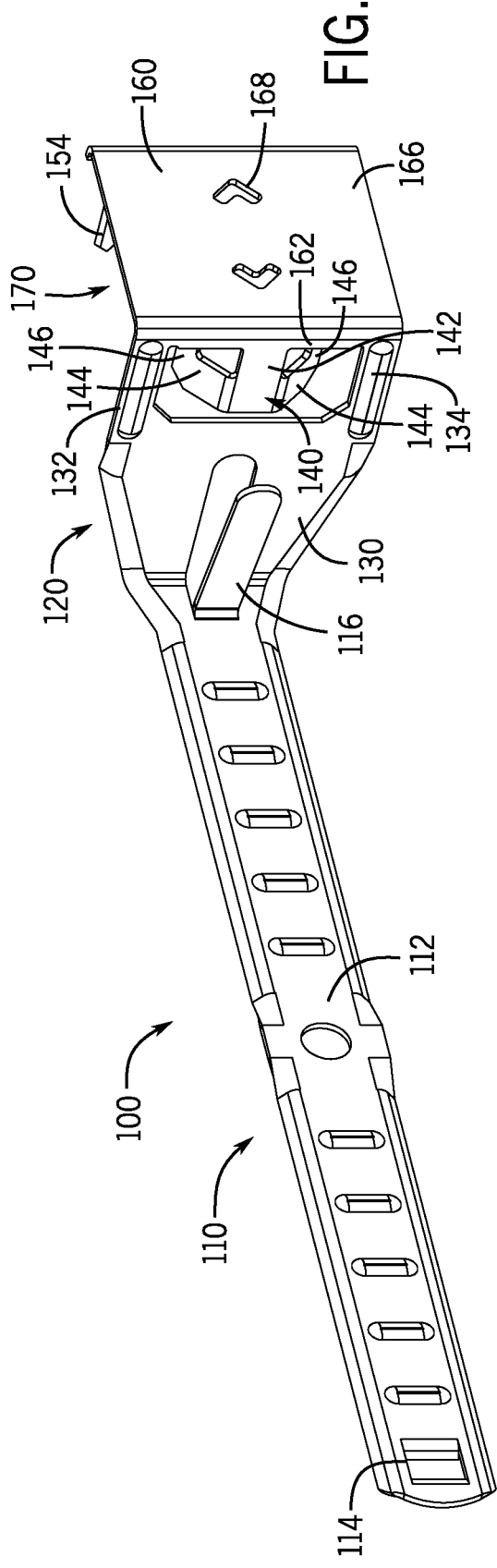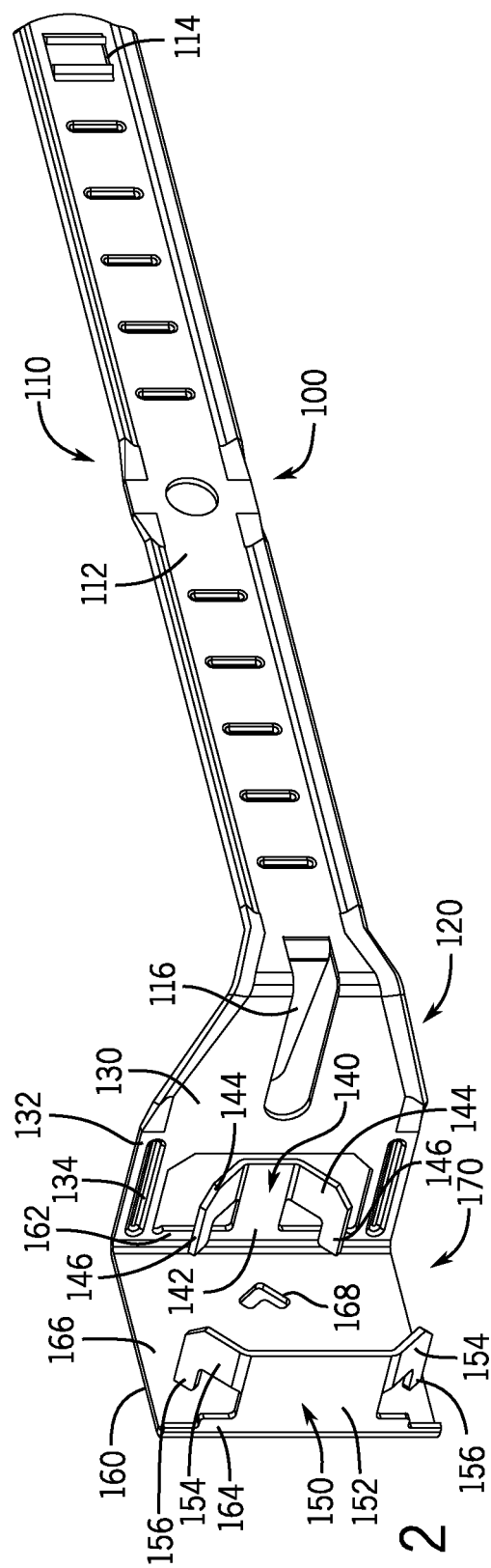

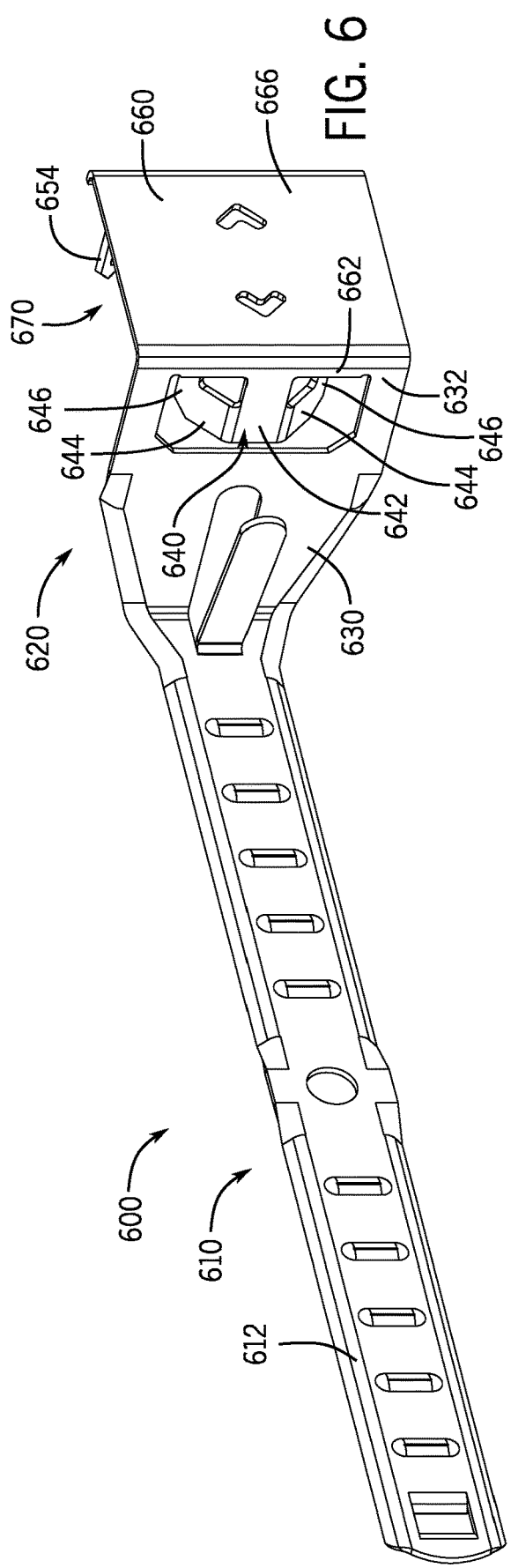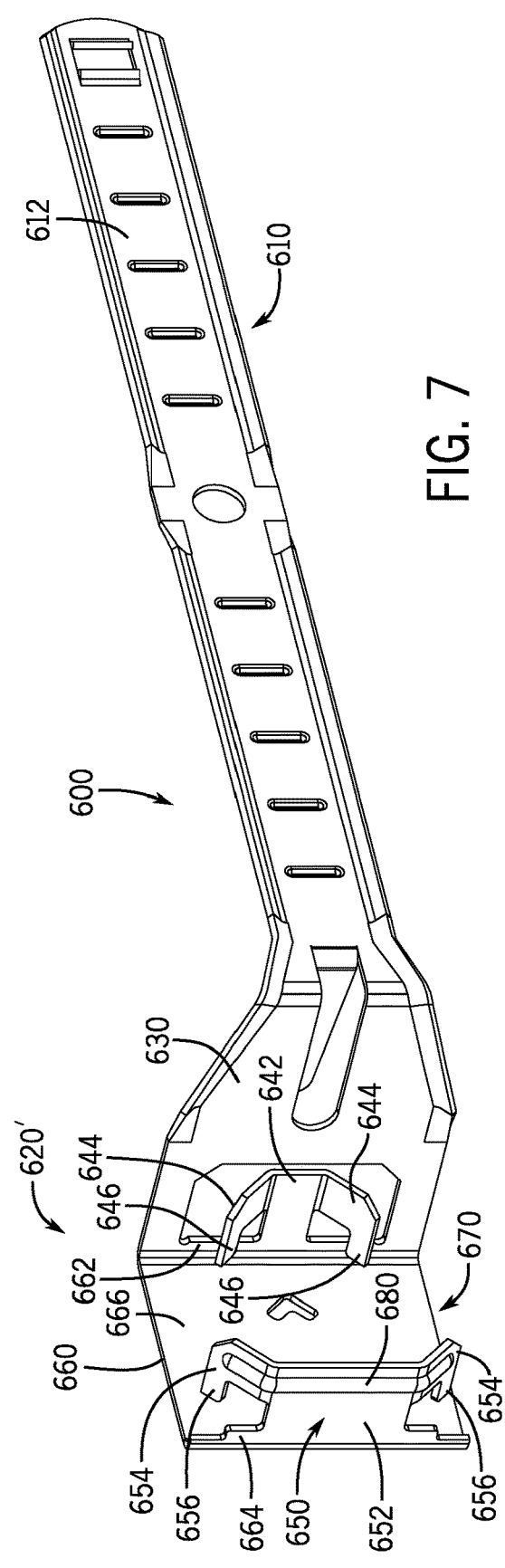

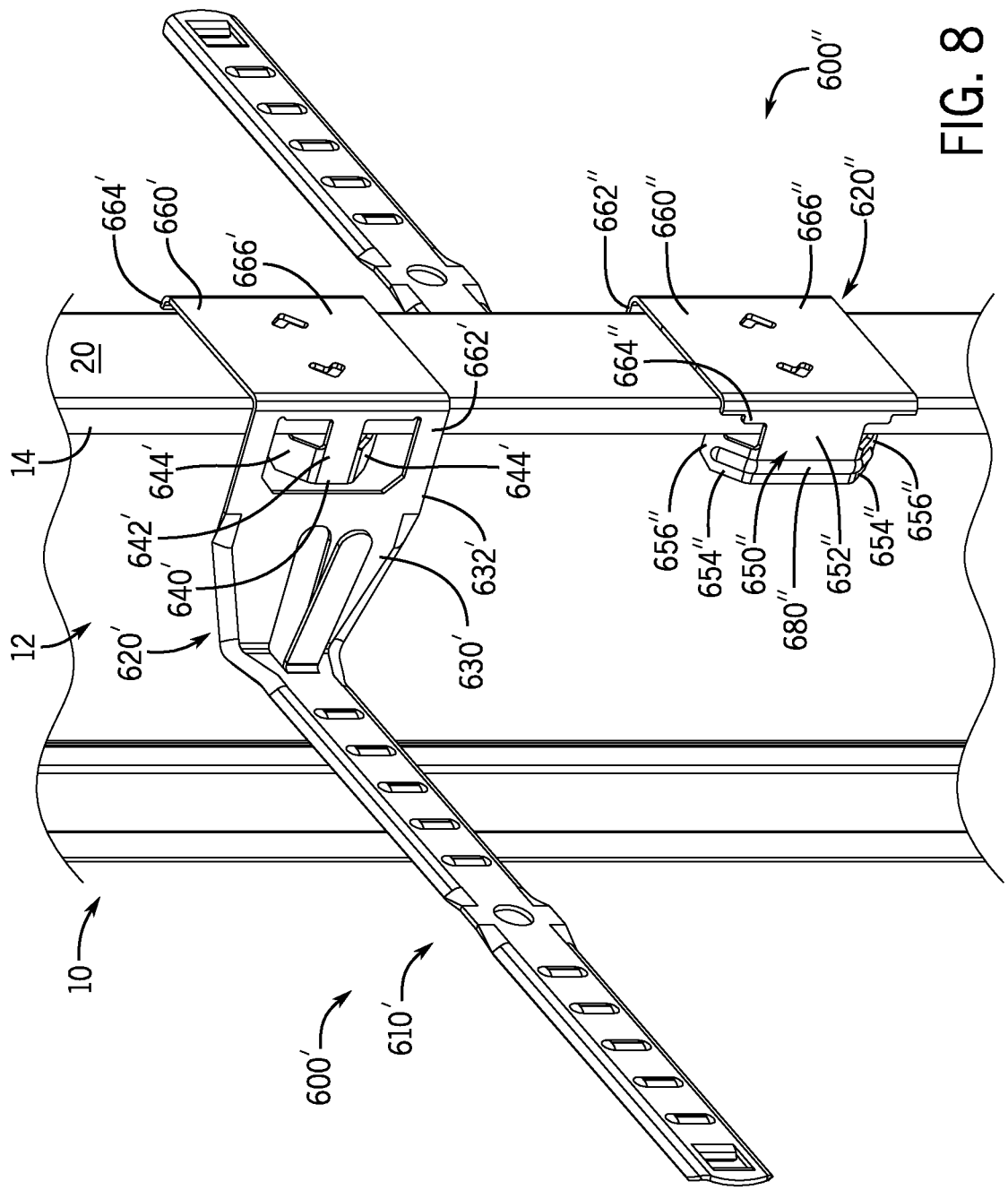

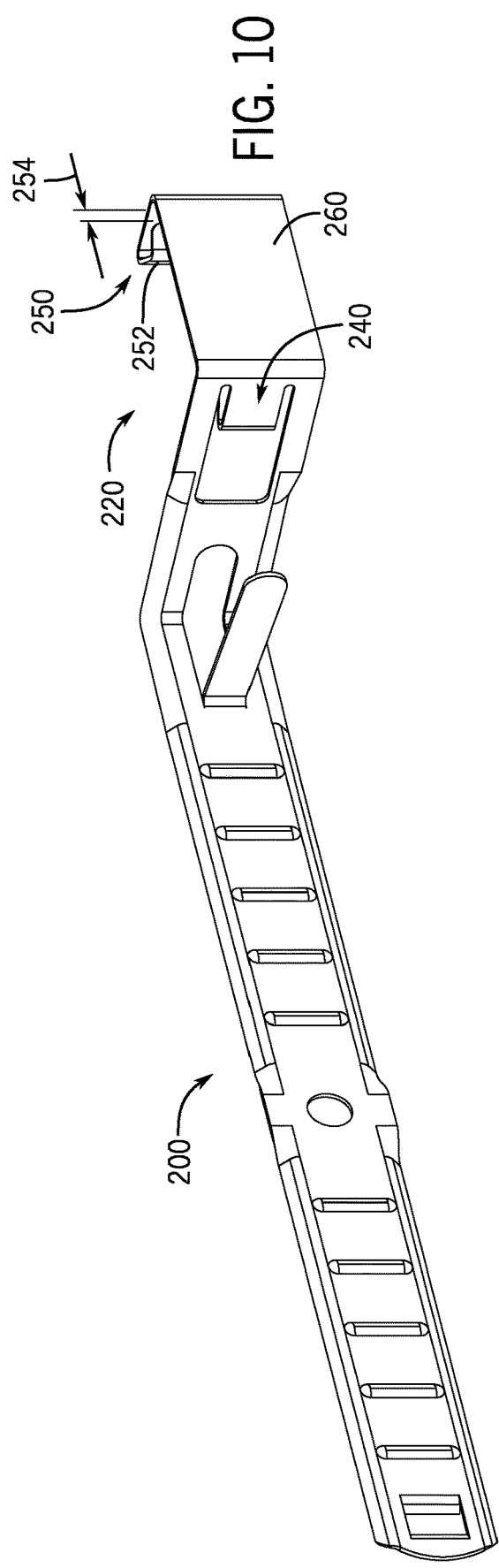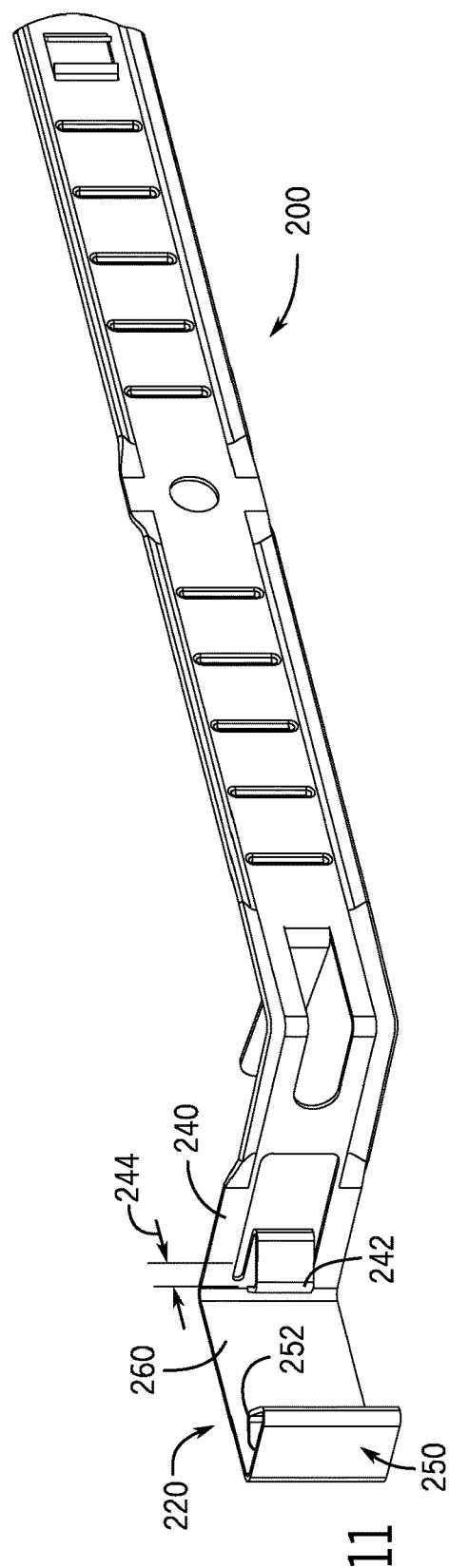

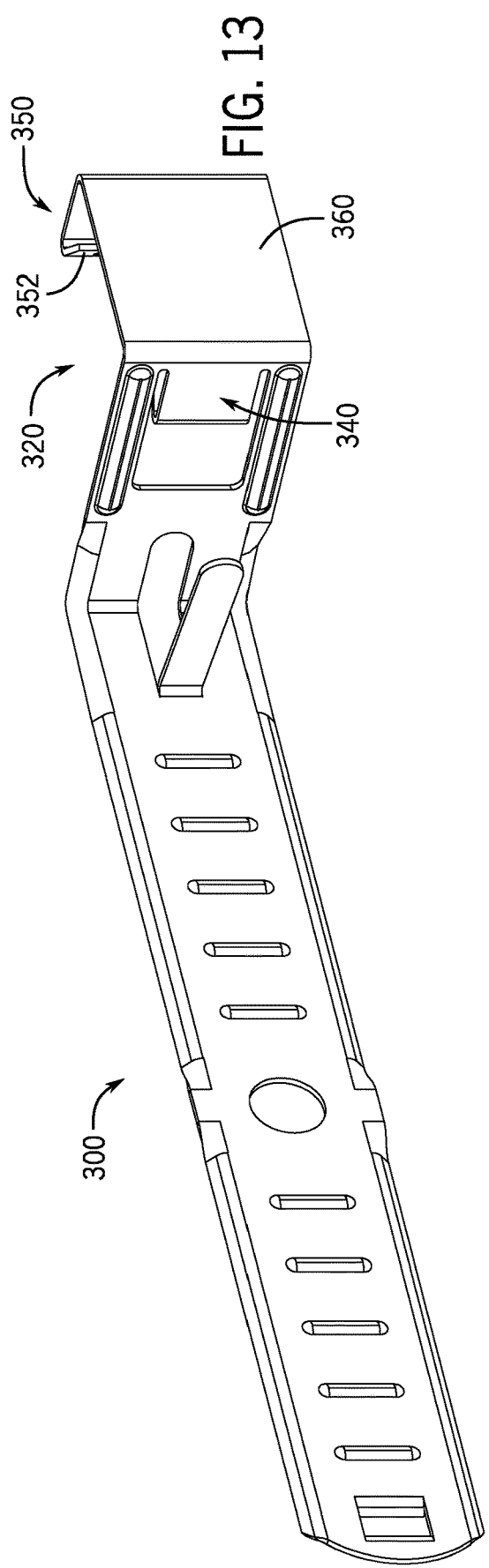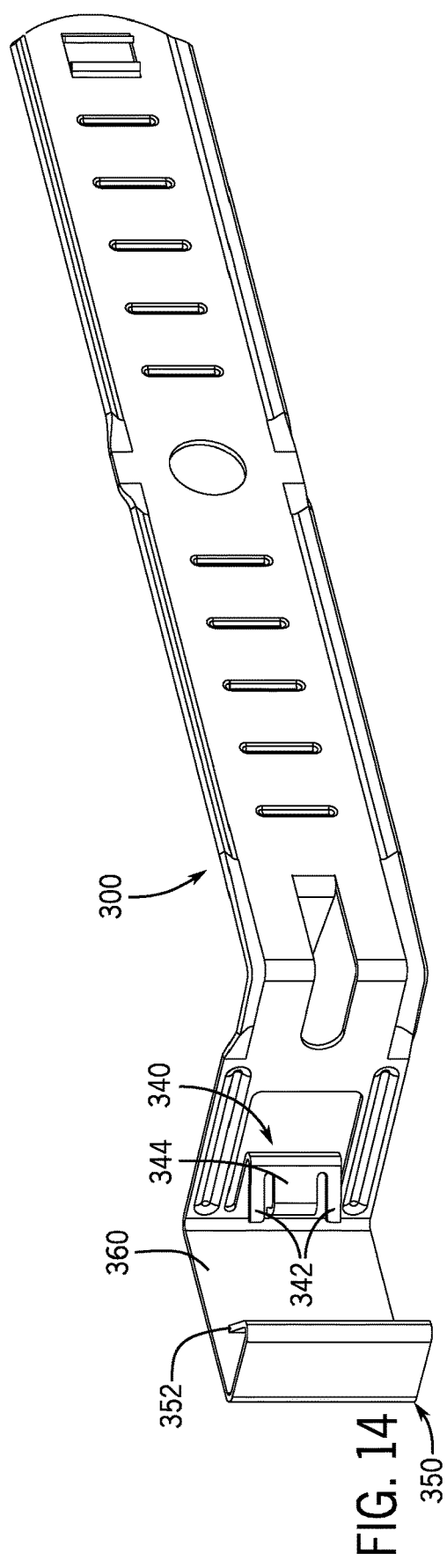

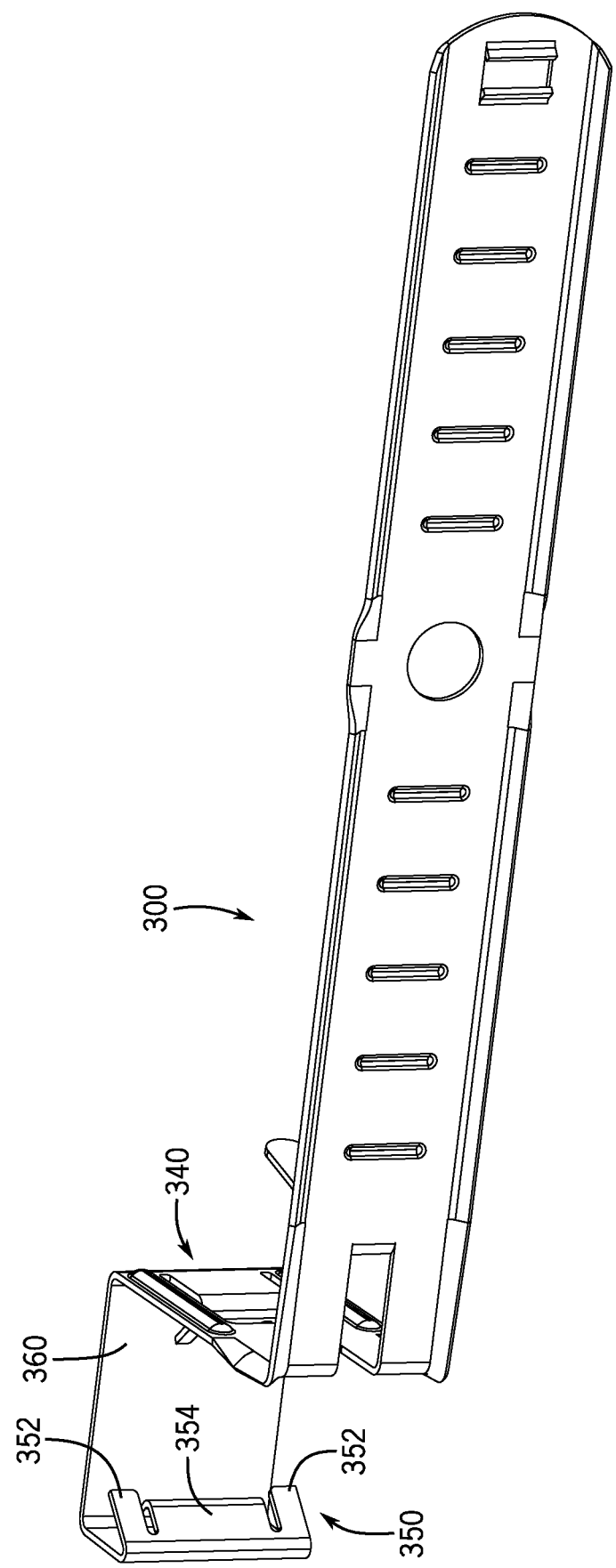

WIRING CLIPS FOR SECURING CONDUCTORS TO A FRAMING MEMBER

RELATED APPLICATIONS

This application claims priority under 35 U.S.C. 119 from U.S. Provisional Application No. 62/809,859 filed Feb. 25, 2019 and is incorporated herein by reference in its entirety.

BACKGROUND

Providing code compliant support for electrical cables can be labor intensive or, at the very least, time consuming. In some contexts, such as for walls on which sheetrock will be hung, cables are required to be installed such that the nearest outside surface of the cable is not less than 1.25 inches from the nearest edge of a framing member (i.e., a stud) where nails or screws are likely to penetrate. See National Electrical Code Art. 300.4(D). In those and other contexts, supporting electrical cables can require either securing individual cables or groups of cables directly to the stud or fastening a device to stud that is configured to retain the cables. Each of these methods can require substantial installation time to locate and fasten either the cables or the device to the stud.

SUMMARY

Some embodiments of the invention provide a wiring clip for securing one or more wires to a stud. The stud can include an open side with a lip, a closed side with a side wall, and a front wall that extends between the side wall and the lip. The wiring clip can include a wire-support portion configured to engage the one or more wires and an attachment portion that at least partly defines an inner recess that can be configured to receive the stud. The attachment portion can be configured to secure the wiring clip to the stud without the use of separate fasteners. The attachment portion can include a connection portion that extends from the wire-support portion; a first arm that extends from the connection portion; a second arm that extends opposite the first arm relative to the inner recess; and a linking portion that extends between the first arm and the second arm and configured to contact the front wall of the stud. Each of the first and second arms can include a stem that includes a contact portion and adjoins the linking portion, a biasing tab that extends from the stem and angles into the inner recess, and a hook that extends from the biasing tab towards the linking portion. The wiring clip can be configured to be installed in first and second orientations, with the linking portion extending across the front wall of the stud. In the first orientation, the first-arm hook can extend into the open side of the stud behind the lip, and the second-arm biasing tab can engage the side wall of the stud to urge at least one of the first arm or the connection portion into engagement with the stud. In the second orientation, the second-arm hook can extend into the open side of the stud behind the lip, and the first-arm biasing tab can engage the side wall of the stud to urge the second arm into engagement with the lip of the stud.

Other embodiments of the invention provide a clip for securing one or more conductors to a stud. The clip can include a support portion and an attachment portion that is integrally formed with the support portion and at least partly defines an inner recess that is configured to receive the stud, to secure the clip to the stud without the use of separate fasteners. The attachment portion can include a connection portion extending from the support portion, a linking portion, a first arm extending from the linking portion, and a second arm extending from the linking portion opposite the first arm. The first arm can include a first-arm hook with a free end that extends towards the linking portion within the inner recess. The second arm can include a second-arm hook with a free end that extends towards the linking portion within the inner recess. The attachment portion can be configured to engage the stud in first and second orientations, with the first-arm hook extending into an open side of the stud behind a lip of the stud and the second-arm hook engaging a side wall of the stud in the first orientation, and with the second-arm hook extending into the open side of the stud behind the lip and the first-arm hook engaging the side wall of the stud in the second orientation.

Yet other embodiments of the invention provide a method of securing one or more wires to a stud using a wiring clip. The method can include inserting the front wall of the stud into an inner recess of the wiring clip by angling the wiring clip relative to the stud to selectively insert either one of a first-arm hook on a first arm of a wiring clip or a second-arm hook on a second arm of the wiring clip past a lip of the stud into an open side of the stud. The method can also include urging the wiring clip towards the stud while maintaining the first-arm hook or the second-arm hook past the lip within the open side of the stud to further move the front wall of the stud into the inner recess and engage either one of the second arm or the first arm, respectively, with a side wall of the stud to urge the first arm or the second arm, respectively, into an exterior surface of the lip of the stud and thereby secure the wiring clip to the stud without separate fasteners. Additionally, the method can include securing the one or more wires to the wiring clip using a wire-support portion.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 1 is a top front isometric view of a support device according to an embodiment of the invention;

FIG. 2 is a top rear perspective view of the support device of FIG. 1;

FIG. 6 is a top front isometric view of another embodiment of a support device according to the invention;

FIG. 7 is a top rear perspective view of the support device of FIG. 6;

FIGS. 8 and 9 are a top front and rear isometric view of a set of support devices according to the embodiment of the invention shown in FIG. 6 installed on a framing member;

FIG. 10 is a top front isometric view of a support device according to another embodiment of the invention;

FIGS. 11 and 12 are top rear perspective views of the support device of FIG. 10;

FIG. 13 is a top front isometric view of a support device according to another embodiment of the invention;

FIGS. 14 and 15 are top rear isometric views of the support device of FIG. 13;

DETAILED DESCRIPTION

Figure 3:
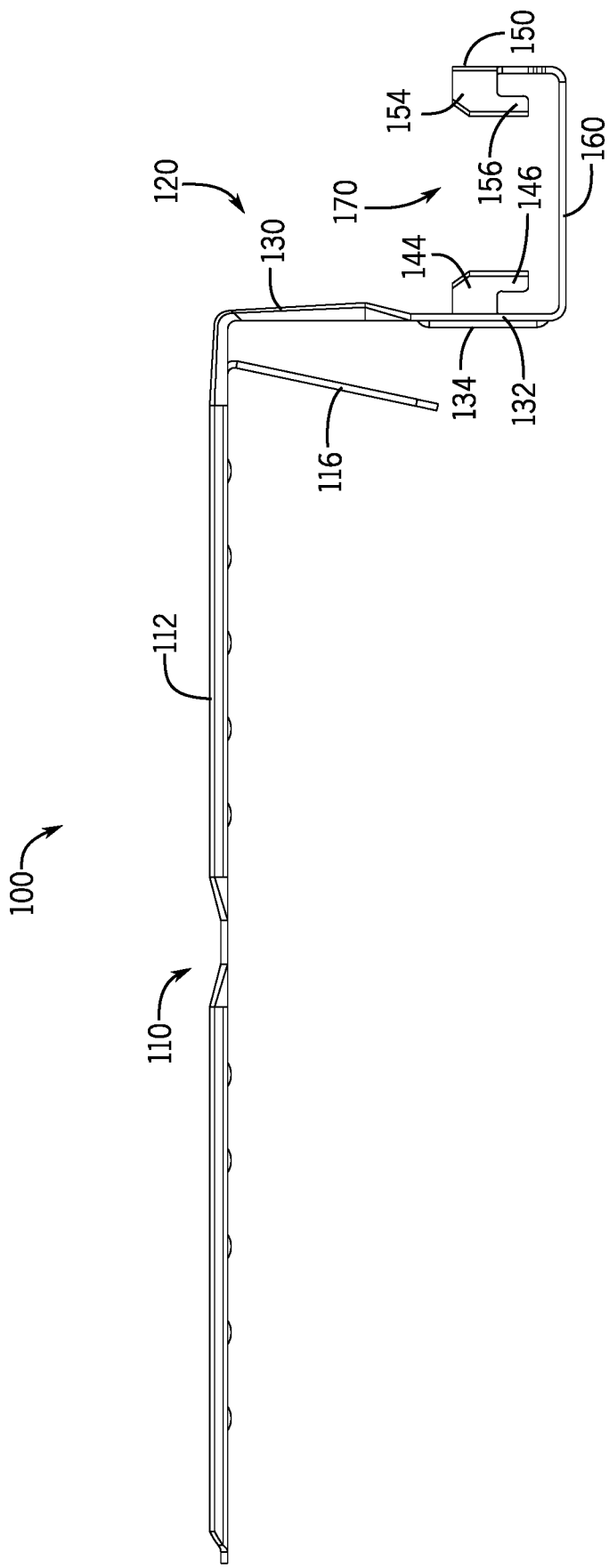
FIG. 3 is a top plan view of the support device of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a wiring clip that can be used to support a cable or a plurality of cables to a framing member (e.g., a stud), or to similarly support other electrical conductors. The context and particulars of this discussion are presented as examples only. For example, embodiments of the disclosed invention can be configured in various ways, including with other shapes and arrangements of elements. Also, some embodiments of the disclosed invention can be formed from a single piece of material, which can be bent, punched, cut-out, etc., to form a wiring clip, although other manufacturing approaches are also possible. Similarly, embodiments of the invention can be used with various arrangements of framing members or framing members other than those expressly illustrated or described herein.

In conventional arrangements, securing cable or other wiring to a stud can be achieved through various methods, including securing the cable directly to a stud with clamps or straps fastened to the stud, fastening to a stud a support device that is configured to support the cable adjacent to the stud, or providing a support member between two neighboring studs and fastening the cable to the support member with clamps or straps. For example, a clamp, such as a one-hole strap, can be used to secure the cable to the stud. Although these conventional arrangements can provide an adequate support, labor can be fairly intensive for each arrangement and space can be limited along the depth of a stud, limiting the number of cables that can be secured thereto. Further, many conventional designs require the use of a clamping or clipping device and separate fasteners to secure wiring to a stud. This can also result in more cumbersome or time-consuming installation.

Embodiments of the invention can address these or other issues. For example, in some embodiments, a wiring clip according to the invention can provide a relatively simple securement of a cable (or other wiring) to a stud that can secure the cable without necessarily requiring the use of separate fasteners. As another example, some embodiments of the invention can secure multiple cables to a stud at the same time with only a single device. In some embodiments, wiring clips according to the invention can be readily installed by hand, including without the use of tools. In some embodiments, wiring clips according to the invention can be easily installed even after cable or conduit have been connected to a relevant electrical box or other support.

FIGS. 1-3 illustrate an example wiring clip 100 according to an embodiment of the present invention. The wiring clip 100 includes a wire-support portion 110 and an attachment portion 120 that is integrally formed with the wire-support portion 110 and defines an inner recess 170 configured to receive a stud 10 (see FIGS. 4 and 5).

The wire-support portion 110 includes a bendable strap 112 and a locking tab 116. The bendable strap 112 is configured to fold back on itself (e.g., in half), and has an aperture 114 configured to receive the locking tab 116. The locking tab 116 is configured to be bent (not shown) after being received in the aperture 114 to retain the bendable strap 112 in the bent position and thereby retain cables or other conductors (not shown) received within the bent bendable strap 112.

The attachment portion 120 has a connection portion 130, a first arm 140 extending along the connection portion 130, a second arm 150 opposite the first arm 140, and a linking portion 160 extending between the connection portion 130 (and the first arm 140) and the second arm 150.

Generally, arms of wiring clips according to the invention can be configured to for biased engagement with surfaces of a relevant stud, and with hooks to help engage the stud. For example, in the wiring clip 100, the first arm 140 has a narrower first-arm stem 142 and a wider first contact portion 162, and a first-arm biasing tab 144 that extends from the first-arm stem 142 and into the inner recess 170. A first-arm hook 146 is provided on the first-arm biasing tab 144 and extends from the first-arm biasing tab 144 towards the linking portion 160. As depicted in FIGS. 1-3, the first arm 140 of the wiring clip 100 has two first-arm biasing tabs 144 or more, each with respective first-arm hooks 146, extending opposite each other from the first-arm stem 142 and as mirror images of each other, although other configurations are possible. In the illustrated embodiment, the first arm 140 is generally symmetrical, which may provide substantially balanced loading when the wiring clip 100 is secured to a stud. However, other configurations are possible.

In the illustrated embodiment, the first arm 140 is formed from a cut-out in the connection portion 130. The cut-out also defines a set of support members 132 on opposing sides of the first arm 140, which connect the connection portion 130 to the linking portion 160. In some embodiments, the support members 132 can include additional features such as deformed (e.g., extruded) portions 134 that are configured to add additional rigidity to the support members 132.

As shown in FIG. 2 in particular, the second arm 150 has a narrower second-arm stem 152 and a wider second contact portion 164, and a second-arm biasing tab 154 that extends from the second-arm stem 152 and into the inner recess 170. A second-arm hook 156 is provided on the second-arm biasing tab 154 and extends from the second-arm biasing tab 154 towards the linking portion 160. Similar to the first arm 140, the second arm 150 can have two second-arm biasing tabs 154 or more, each with respective second-arm hooks 156, extending opposite each other from the second-arm stem 152 and as mirror images of each other. As shown in FIG. 3 in particular, the hooks 146, 156 are substantially similar to each other, including with regard to the extension of the hooks 146, 156 into the inner recess 170 and towards the linking portion 160. This may be useful, for example, to allow for easy installation of the wiring clip 100 in either of two opposite orientations, with similar security of attachment. In other embodiments, however, other configurations are possible.

The linking portion 160 is generally planar and includes a third contact portion 166. In some embodiments, the third contact portion 166 or other features of a linking portion may include cut-outs, which can exhibit various designs. The cut-outs 168, for example, shown here as chevrons or arrows, can indicate a centerline of the wire-support portion 110 and provide windows to view a stud to which the wiring clip 100 is secured, in order to guide installation of the wiring clip 100 (e.g., at a particular height on a stud). In some embodiments, similar or other cut-outs can allow screws or other supplemental fasteners to be easily installed to further secure a wiring clip to a stud, although some embodiments may be usable without any fasteners.

In the illustrated embodiment, the wiring clip 100 generally flares outwardly relative to a perspective moving from the wire-support portion 110 along the attachment portion 120 to the connection portion 130. This may be useful, for example, in order to allow for easy bending of the wire-support portion 110 to engage cables or other wires, while providing a sufficiently wide profile at the connection portion 130 to spread the load from supported wiring across a wider area on a stud while also ensuring substantial gripping force upon engagement with the stud. In other embodiments, however, other configurations are possible.

Figure 4:
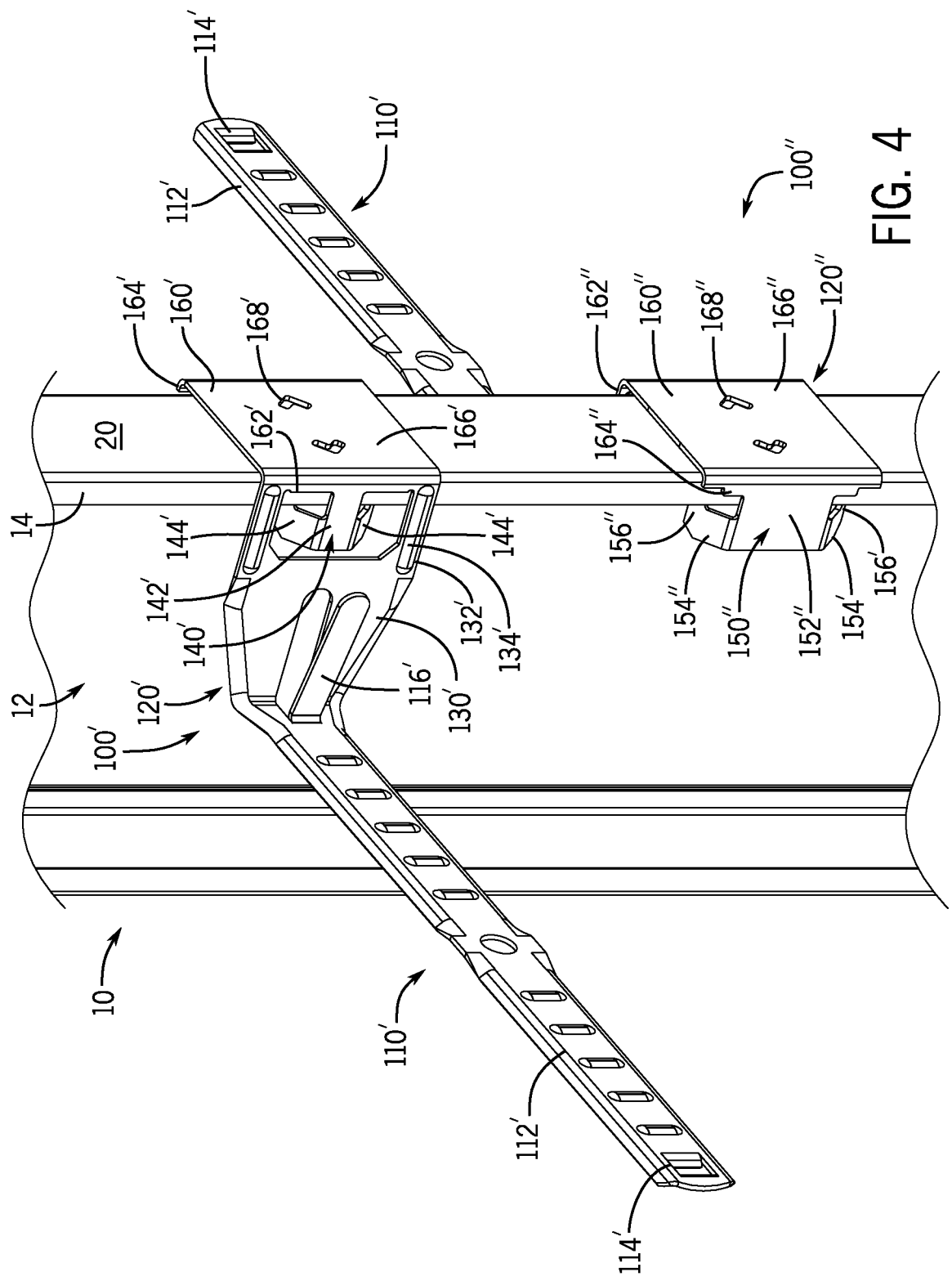
FIGS. 4 and 5 are top front and rear isometric views of a set of support devices according to the embodiment of the invention shown in FIG. 1 installed on a framing member.
Figure 5:
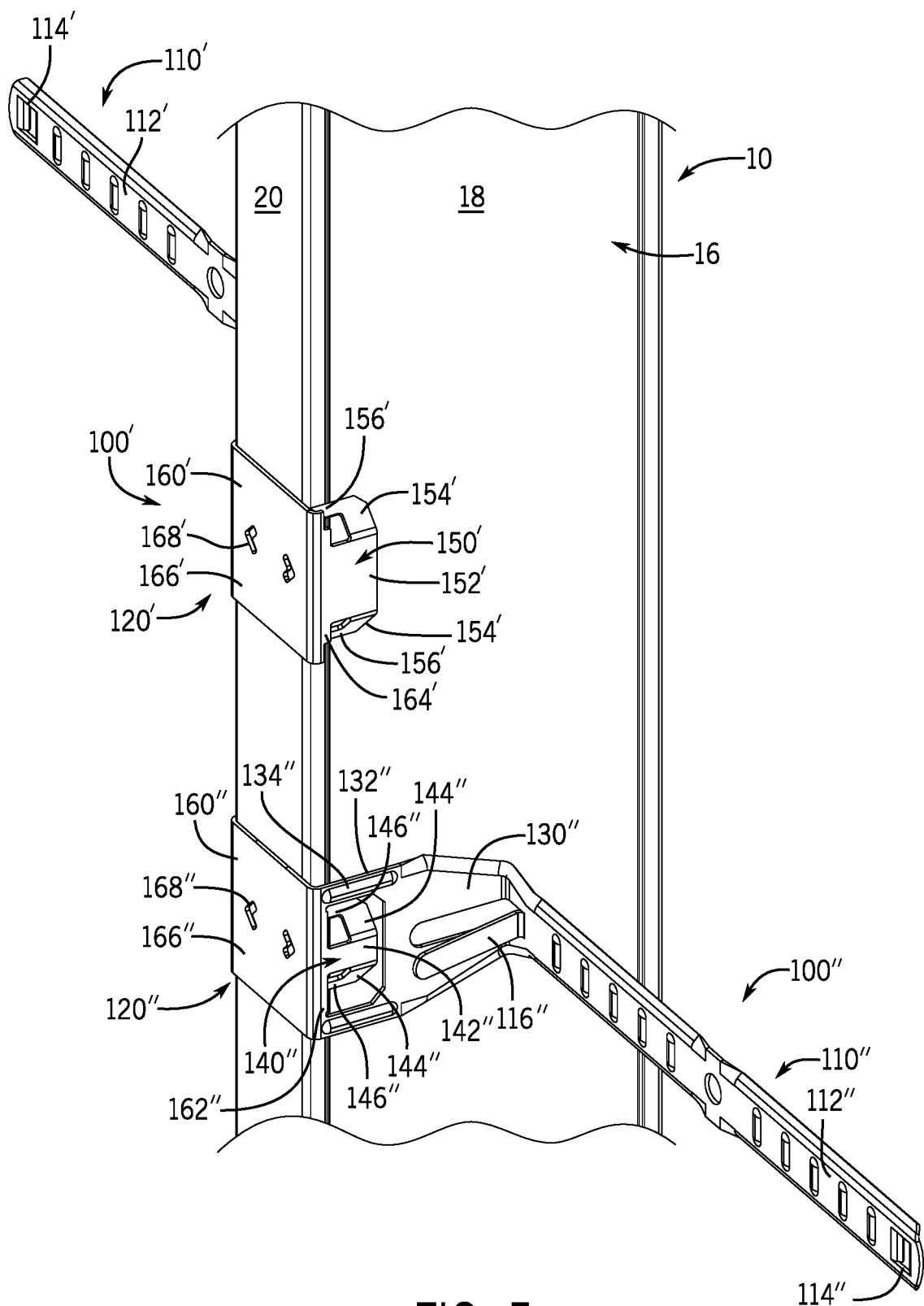

Usefully, some embodiments of the disclosed wiring clip, including the wiring clip 100, can be installed on a stud in at least two different orientations. This can be useful, for example, in order to provide users with the flexibility to support wiring on either side of a stud, including without regard to whether a particular side of a stud (e.g., a metal stud) is open or closed. In this regard, for example, FIGS. 4 and 5 illustrate a first wiring clip 100' installed on the stud 10 in a first orientation and a second wiring clip 100" installed on the stud 10 in a second orientation. The wiring clips 100', 100" are substantially identical to the wiring clip 100 (see FIGS. 1-3) and to each other, and features of the wiring clips 100', 100" that are substantially identical to features of the wiring clip 100 are indicated by appended "primes" (') and "double primes" (") on the relevant reference number.

Although wiring clips according to embodiments of the invention can be secured to studs of a variety of configurations, the stud 10 illustrates a particular useful example configuration. In this regard, the stud 10 has an open side 12 with a lip 14, a closed side 16 with a side wall 18, and a front wall 20. The use of the term "front" in defining the front wall 20 of the stud 10, or as otherwise similarly used herein, should not be interpreted as being limiting with respect to the orientation of a particular stud or associated wiring clip. Rather, it is being used to more easily identify the portion of the stud 10 that extends perpendicularly to and between the open side 12 and the closed side 16. In certain installations, for example, the front wall 20 of the stud may actually face away from a relevant area (e.g., a room being wired).

With the wiring clip 100' in the first orientation, as shown in FIG. 4, the first arm 140' is positioned adjacent to the open side 12 of the stud 10 and the first-arm hooks (not shown in FIG. 4) extend into the open side 12 behind the lip 14. In some embodiments, the first-arm hooks may contact the stud 10 upon installation, such as on an inner surface of the lip 14 or an inner surface of the front wall 20. In some cases, however, the first-arm hooks may be spaced somewhat apart from the stud and may, for example, contact the stud only when the wiring clip 100' is subject to a particular loading.

Also with the wiring clip 100' in the first orientation, the second arm 150' of the wiring clip 100', as can be seen in FIG. 5, is positioned adjacent to the closed side 16 of the stud 10, such that the second-arm biasing tab 154' engages the side wall 18 to urge the first arm 140' (e.g., at the first contact portion 162') or the connection portion 130' (e.g., at the support members 132') into engagement with the stud 10 (via transfer of force along the clip 100' through the intervening linking portion 160'). The third contact portion 166' is positioned adjacent to (e.g., in contact with) the front wall 20 of the stud 10. In this way, for example, the biased engagement of the second arm 150', and of the first arm 140', the connection portion 130', or the linking portion 160' with the stud can firmly secure the wiring clip 100' to the stud 10, without requiring the use of any separate fasteners. Cables or other wiring can then be likewise firmly secured to the stud 10 via engagement by the wire-support portion 110'.

In this regard, the wider configuration of the contact portions 162', 164' can be particularly useful for some installations. For example, the narrower profiles of the stems 142', 152' can allow the stems 142', 152' to flex as needed, including to allow relatively easy installation and to provide appropriate biasing of the clip 100' due to contact of the hooks 156' with the closed side 16 of the stud 10. Further, the wider profiles of the contact portions 162', 164' may flex comparatively little under loading while also providing a relatively large interface area to be seated on a stud (e.g., on the lip 14, depending on the orientation of the clip 100').

In some embodiments, hooks or other features on a biasing tab or other part of an arm can be configured to engage particular parts or features on a closed side of a stud. For example, in some cases, hooks on a biasing tab can be configured to seat on or immediately behind a step or other raised feature on a side wall of stud. For some configurations, this hooked engagement of a closed side of a stud can help to further secure a clip to a stud, without requiring the use of fasteners.

With the wiring clip 100" in the second orientation (e.g., rotated 180° from the first orientation), as shown, the second arm 150" is positioned adjacent to the open side 12 of the stud 10 and the second-arm hooks (not shown in FIG. 4) extend into the open side 12 behind the lip 14. As with the wiring clip 100', in some embodiments, the second-arm hooks may contact the stud 10 upon installation. In some cases, the second-arm hooks may be spaced somewhat apart from the stud 10 and may contact the stud 10 only when the wiring clip 100" is subject to a particular loading.

Also with the wiring clip 100" in the second orientation, the first arm 140" is positioned adjacent to the closed side 16 of the stud 10, with the first-arm biasing tab 144" engaging the side wall 18 of the stud 10 to urge the second arm 150"

(e.g., the second contact portion 164") into engagement with the stud 10 (again, via transfer of force along the clip 100' through the intervening linking portion 160'). The third contact portion 166" is positioned adjacent to (e.g., in contact with) the front wall 20 of the stud 10. In this way, for example, the biased engagement of the first arm 140", and of the second arm 150", the connection portion 130", or the linking portion 160" with the stud 10 can firmly secure the wiring clip 100" to the stud 10, without requiring the use of any separate fasteners. Cables or other wiring can then be likewise firmly secured to the stud 10 via engagement by the wire-support portion 110".

As similarly noted for the wiring clip 100', in this regard, the wider configuration of the contact portions 162", 164" can be particularly useful for some installations. For example, the narrower profiles of the stems 142", 152" can allow the stems 142", 152" to flex as needed, including to allow relatively easy installation and to provide appropriate biasing of the clip 100" due to contact of the hooks 156" with the closed side 16 of the stud 10. Further, the wider profiles of the contact portions 162", 164" may flex comparatively little under loading while also providing a relatively large interface area to be seated on a stud (e.g., on the lip 14, depending on the orientation of the clip 100').

FIGS. 6 and 7 show a wiring clip 600 according to another embodiment of the present invention. In many aspects, the wiring clip 600 is similar to the wiring clip 100 described above, and similar numbering, in the 600 series, is used for the wiring clip 600. For example, the wiring clip 600 has a wire-support portion 610, with a bendable strap 612, and an attachment portion 620 including a connection portion 630, a first arm 640 extending along the connection portion 630, a second arm 650 opposite the first arm 640, and a linking portion 660 extending between the first and second arms 640, 650. The first arm 640 has a narrower first-arm stem 642, a wider first contact portion 662, and a first-arm biasing tab 644 with a set of first-arm hooks 646. The second arm 650 has a narrower second-arm stem 652, a wider second-arm contact portion 664, and a second-arm biasing tab 654 with a set of second-arm hooks 656.

In some aspects, however, the wiring clips 100, 600 differ from each other. For example, the wiring clip 600 does not include extruded portions along support members 632 thereof, but does include a deformed (e.g., extruded) portion 680 that extends along the second-arm stem 652 and the second-arm biasing tabs 654. The extruded portion can provide increased rigidity to the biasing tabs 654 relative to deflection during installation, and can correspondingly result in a more secure engagement of the clip 600 with a stud when the biasing tabs 654 are engaged therewith.

Figure 9:
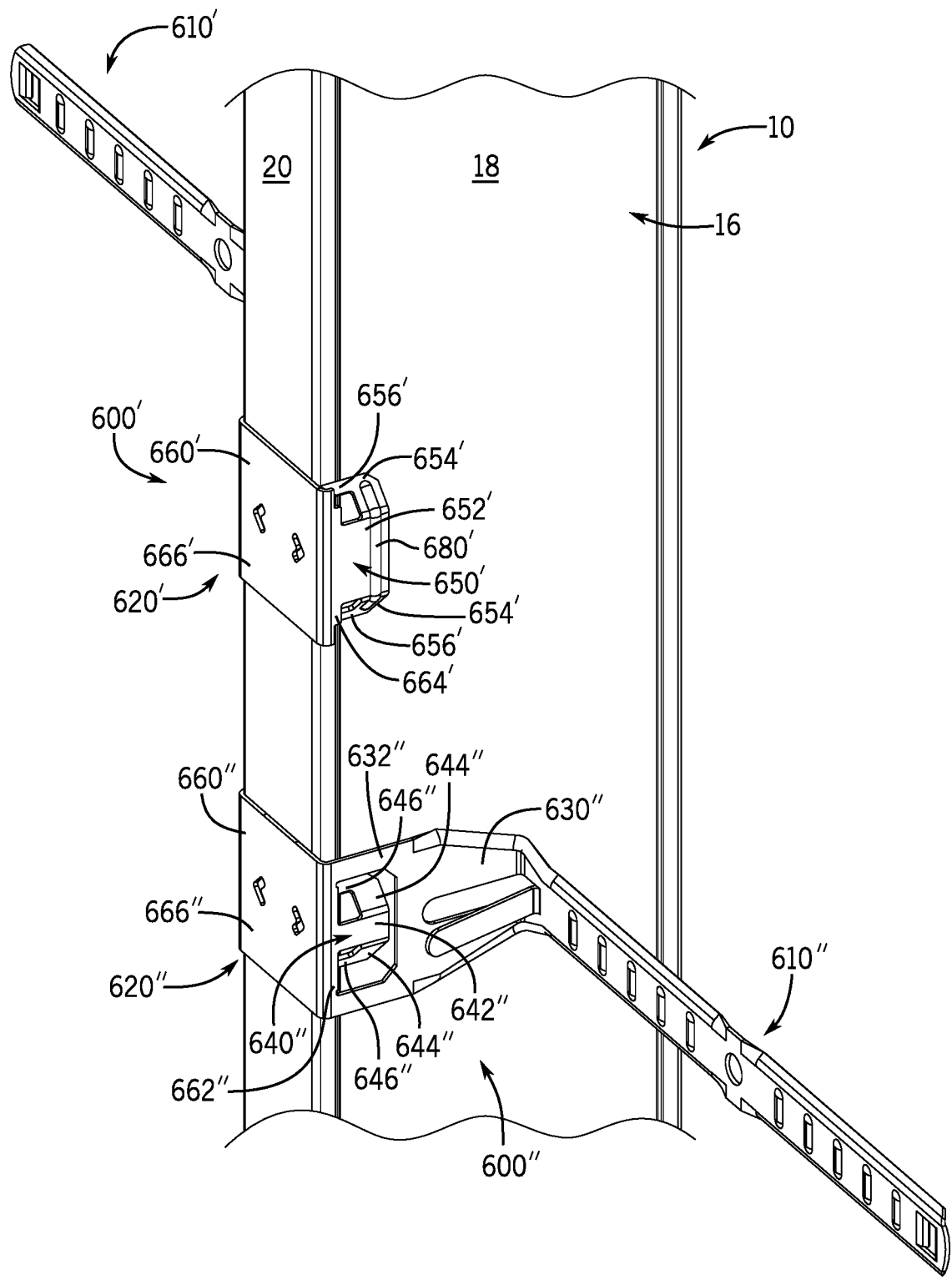

With the illustrated arrangement, similarly to the wiring clip 100, the wiring clip 600 can be secured to a stud, without requiring separate fasteners, in at least two opposite orientations. FIGS. 8 and 9 show the wiring clip 600 in a first orientation and a second orientation represented by wiring clips 600', 600", respectively. In the first orientation, the stud 10 is received within the inner recess 670' with the first arm 640' positioned adjacent to the open side 12 of the stud 10 and the first-arm hooks 646 (not shown in FIG. 8) extending into the open side 12 behind the lip 14. The second arm 650' of the wiring clip 600', as can be seen in FIG. 9, is positioned adjacent to the closed side 16 of the stud 10, such that the second-arm biasing tab 654' engages the side wall 18 to urge the first arm 640' (e.g., at the first contact portion 662' of the first-arm stem 642') or the connection portion 630' (e.g., at the support members 632') into engagement with the stud 10. The third contact portion 666' is positioned adjacent to (e.g., in contact with) the front wall 20 of the stud 10. In this way, for example, the biasing engagement of the second arm 650', and of the first arm 640', the connection portion 630', or the linking portion 660' with the stud 10 can firmly secure the wiring clip 600' to the stud 10, without requiring the use of any separate fasteners. Cables or other wiring can then be likewise firmly secured to the stud 10 via engagement by the wire-support portion 610'.

In contrast, in the second orientation, the stud 10 is received within the inner recess 670" with the second arm 650" positioned adjacent to the open side 12 of the stud 10 and the second-arm hooks (not shown) extending into the open side 12 behind the lip 14. As with the wiring clip 600', in some embodiments, the second-arm hooks may contact the stud 10 upon installation. In some cases, the second-arm hooks may be spaced somewhat apart from the stud 10 and may contact the stud 10 only when the wiring clip 600" is subject to a particular loading. Looking at FIG. 9, in particular, the first arm 640" is shown positioned adjacent to the closed side 16 of the stud 10, with the first-arm biasing tab 644" engaging the side wall 18 of the stud 10 to urge the stud 10 into the second arm 650" (e.g., the second contact portion 664" of the second-arm stem 652). The third contact portion 666" is positioned adjacent to (e.g., in contact with) the front wall 20 of the stud 10. In this way, for example, the biased engagement of the first arm 640", and of the second arm 650", the connection portion 630", or the linking portion 660" with the stud 10 can firmly secure the wiring clip 600" to the stud 10, without requiring the use of any separate fasteners. Cables or other wiring can then be likewise firmly secured to the stud 10 via engagement by the wire-support portion 610".

Thus, for example, the wiring clip 600, similarly to the wiring clip 100, can be manually secured to a building support structure, including an open-sided or other stud, without necessarily requiring the use of separate fasteners. Further, the wiring clips 100, 600—and wiring clips according to this disclosure generally—can be secured in multiple different orientations, including orientations that are 180° rotated relative to each other, to provide increased adaptability relative to the placement of supported cables or other conductors.

Figure 12:
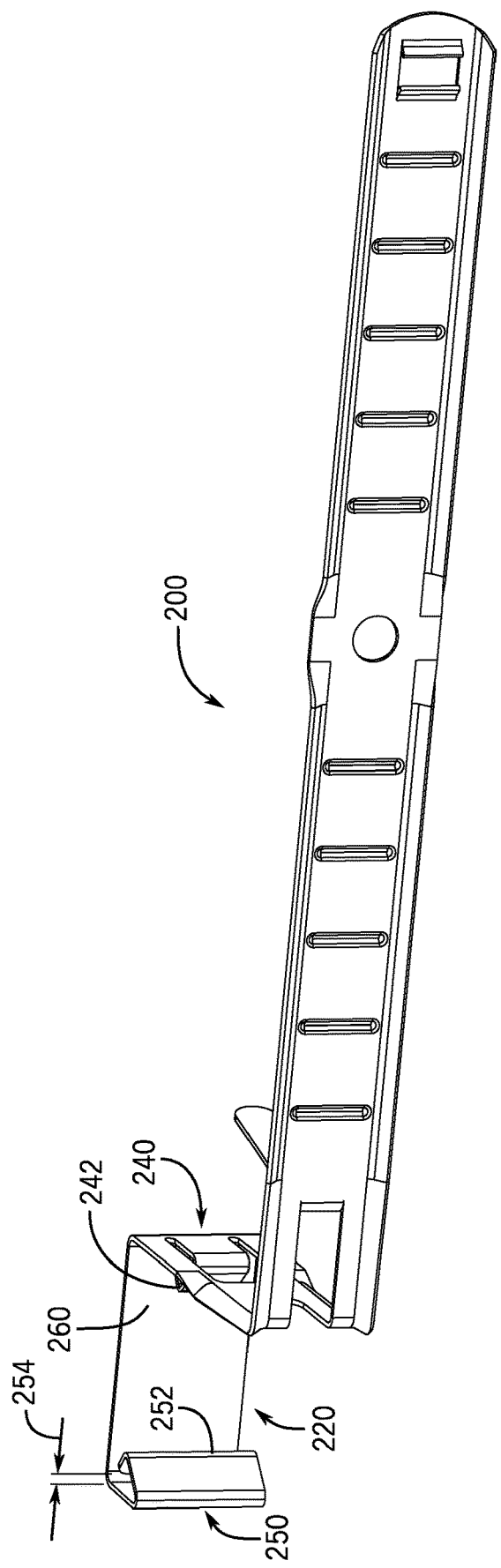

FIGS. 10-12 provide another embodiment of a wiring clip 200 according to the present invention. In many aspects, the wiring clip 200 is similar to the wiring clip 100 described above, and similar numbering, in the 200 series, is used for the wiring clip 200. In some aspects, however, the wiring clips 100, 200 differ from each other. For example, an attachment portion 220 of the wiring clip 200 has a first arm 240 that has a substantially triangular profile with a first-arm peak 242. Further, the first arm 240 defines a first-arm gap 244 configured to receive a lip of a stud (e.g., the lip 14 of the open side 12 of the stud 10 of FIG. 4). A second arm 250 also has a substantially triangular profile with a second-arm peak 252, and defines a second-arm gap 254 that is also configured to receive a lip of an open side of a stud.

With the illustrated arrangement, similarly to the wiring clip 100, the wiring clip 200 can be secured to a stud, without requiring separate fasteners, in at least two opposite orientations. When the wiring clip 200 is in a first orientation relative to the stud 10 (see FIGS. 4 and 5 for reference), for example, the lip 14 of the open side 12 of the stud 10 is received within the first-arm gap 244 of the first arm 240, and the second-arm peak 254 of the second arm 250 is in contact with the side wall 18 of the closed side 16 of the stud 10 to urge the first arm 240 or other feature of the wiring clip 200 into tight engagement with the stud 10. In contrast, when the wiring clip 200 is in a second orientation, the lip 14 of the open side 12 of the stud 10 is received within the second-arm gap 254 of the second arm 250, and the first-arm peak 242 of the first arm 240 is in contact with the side wall 18 of the closed side 16 of the stud 10 to urge the second arm 250 into tight engagement with the stud 10.

FIGS. 13-15 illustrate another embodiment of a wiring clip 300 according to the present invention. In many aspects, the wiring clip 300 is similar to the wiring clip 100 described above, and similar numbering, in the 300 series, is used for the wiring clip 300. In some aspects, however, the wiring clips 100, 300 differ from each other. For example, in contrast to the wiring clips 100, the wiring clip 300 has an attachment portion 320 with a first arm 340 that has biasing tabs formed as a set of first-arm fingers 342 and a first-arm hook 344 extending between the set of first-arm fingers 342. Similarly, a second arm 350 also has a set of second-arm fingers 352 and a second-arm hook 354 extending between the set of second-arm fingers 352.

When the wiring clip 300 is in a first orientation relative to the stud 10 (see FIGS. 4 and 5 for reference), for example, the lip 14 of the open side 12 of the stud 10 is received within the first-arm hook 344 of the first arm 340, and the set of second-arm fingers 352 of the second arm 350 are in contact with the side wall 18 of the closed side 16 of the stud 10 to urge the first arm 340 or other feature of the wiring clip 300 into tight engagement with the stud. In contrast, when the wiring clip 300 is in a second orientation, the lip 14 of the open side 12 of the stud 10 is received within the second-arm hook 354 of the second arm 350, and the set of first-arm fingers 342 of the first arm 340 are in contact with the side wall 18 of the closed side 16 of the stud 10 to urge the second arm 350 into tight engagement with the stud 10.

Figure 16:
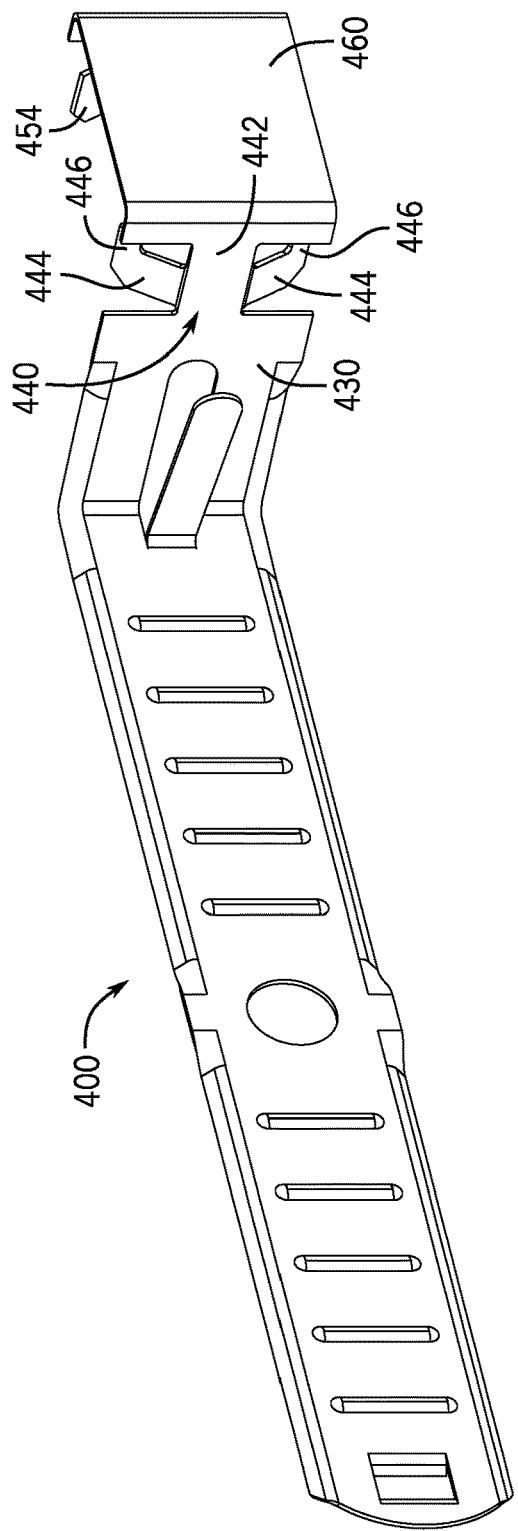
FIG. 16 is a top front isometric view of a support device according to another embodiment of the invention.
Figure 17:
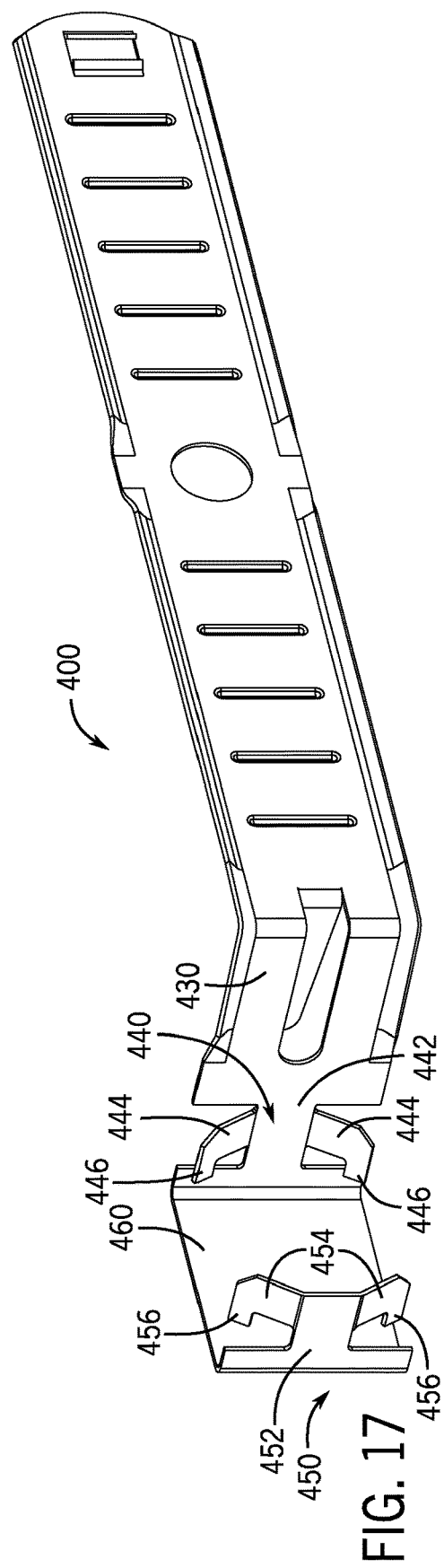
FIG. 17 is a top rear perspective view of the support device of FIG. 14.

FIGS. 16 and 17 show another embodiment of a wiring clip 400 according to the present invention. In many aspects, the wiring clip 400 is similar to the wiring clip 100 described above and similar numbering, in the 400 series, is used for the wiring clip 400. For example, the wiring clip 400 has a first arm 440, with a first-arm stem 442, a first-arm biasing tab 444, and a first-arm hook 446, and a second arm 450, with a second-arm stem 452a second-arm biasing tab 454 and a second-arm hook 456. In some aspects, however, the wiring clips 100, 400 differ from each other. For example, one way in which the wiring clips 100, 400 differ is that a connection portion 430 of an attachment portion 420 is solely connected to a linking portion 460 through a first-arm stem 442 of a first arm 440. Despite this difference, however, the wiring clip 400 can engage a stud, such as the stud 10 (see FIG. 4), substantially similarly as the wiring clip 100, such as described for the wiring clips 100', 100" relative to FIGS. 4 and 5.

In some implementations, devices or systems disclosed herein can be utilized (e.g., installed) using methods that embody certain aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

Figure 18:
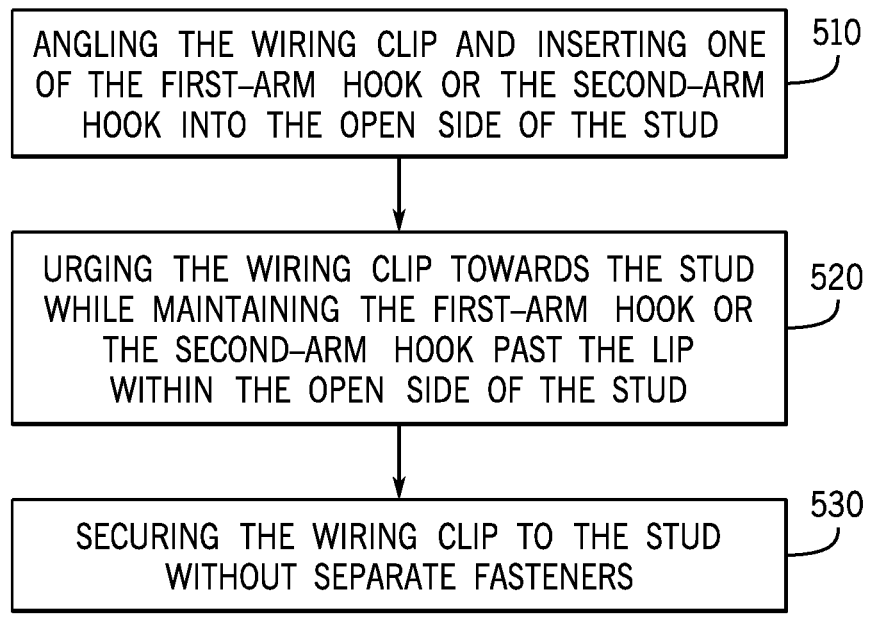
FIG. 18 is a diagram of a method according to an embodiment of the invention.

Correspondingly, FIG. 18 illustrates aspects of a method of securing one or more wires to a stud using a wiring clip according to embodiments of the present invention (e.g., any of the wiring clips 100, 200, 300, 400, 500, or 600 described above). In the illustrated example, the relevant stud includes an open side with a lip, a closed side with a side wall, and a front wall that extends between the side wall and the lip, although other stud configurations are also possible. The wiring clip includes a wire-support portion and an attachment portion that at least partly defines an inner recess. The attachment portion includes a first arm with a first-arm biasing tab and a first-arm hook and a second arm with a second-arm biasing tab and a second-arm hook. The method includes inserting the front wall of the stud into the inner recess of the wiring clip by angling 510 the wiring clip relative to the stud to insert the first-arm hook or the second-arm hook past the lip into the open side of the stud and urging 520 the wiring clip towards the stud while maintaining the first-arm hook or the second-arm hook past the lip within the open side of the stud. This can move the front wall of the stud into the inner recess (e.g., until the front wall seats against a linking portion of the wiring clip) and can engage the second-arm biasing tab or the first-arm biasing tab with the side wall of the stud to urge the wiring clip into the stud opposite the second arm or the first arm, respectively. In this way, for example, the wiring clip can be secured 530 to the stud without separate fasteners. Additionally, before or after securing 530 the wiring clip to the stud, the method can include securing the one or more wires to the wiring clip using the wire-support portion.

In other embodiments, other configurations are possible. For example, certain features and combinations of features that are presented with respect to particular embodiments in discussion above, can be utilized in other embodiments and in other combinations, as appropriate. In this regard, for example, different configurations of attachment portions as presented with respect to a particular one of the wiring clips 100, 200, 300, 400, can be implemented in combination with features of any number of the other wiring clips 100, 200, 300, 400, or others.

Thus, embodiments of the inventions provide improved securement of cables or other wiring to a framing member (e.g., a stud). In some embodiments, wiring clips according to the invention can substantially reduce the time and labor that may be required during installation and use, such as by obviating the need to install a fastener to secure the wiring clip to the stud. Further, some embodiments of the invention can be installed before or after the cable is connected to an electrical box or other structure. Additionally, some embodiments allow for installation of the wiring clip on a stud in two orientations, extending from opposing sides of the stud.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A wiring clip for securing one or more wires to a stud, the stud including an open side with a lip, a closed side with a side wall, and a front wall that extends between the side wall and the lip, the wiring clip comprising:
 a wire-support portion configured to engage the one or more wires; and
 an attachment portion that at least partly defines an inner recess that is configured to receive the stud, the attachment portion being configured to secure the wiring clip to the stud without the use of separate fasteners;

the attachment portion including:
a connection portion that extends from the wire-support portion;
a first arm that extends from the connection portion;
a second arm that extends opposite the first arm relative to the inner recess; and
a linking portion that extends between the first arm and the second arm and is configured to contact the front wall of the stud;
each of the first and second arms including a stem that includes a contact portion and adjoins the linking portion, a biasing tab that extends from the stem and angles into the inner recess, and a hook that extends from the biasing tab towards the linking portion;
the wiring clip being configured to be installed in first and second orientations, with the linking portion extending across the front wall of the stud:
in the first orientation, the first-arm hook extending into the open side of the stud behind the lip, and the second-arm biasing tab engaging the side wall of the stud to urge at least one of the first arm or the connection portion into engagement with the lip of the stud; and
in the second orientation, the second-arm hook extending into the open side of the stud behind the lip, and the first-arm biasing tab engaging the side wall of the stud to urge the second arm into engagement with the lip of the stud.

2. The wiring clip of claim 1, wherein the first arm has a plurality of first-arm biasing tabs, each of the first-arm biasing tabs have a hook extending towards the linking portion.

3. The wiring clip of claim 2, wherein the second arm has a plurality of second-arm biasing tabs, each of the second-arm biasing tabs have a hook extending towards the linking portion.

4. The wiring clip of claim 1, wherein the connection portion has a plurality of support members extending along the first arm to the linking portion.

5. The wiring clip of claim 4, wherein the first arm is formed in a cutout of the connection portion, wherein the cutout of the connection portion at least partially defines the plurality of support members.

6. The wiring clip of claim 5, wherein the first arm is disposed between first and second support members of the plurality of support members, within an opening defined by the cutout.

7. The wiring clip of claim 1, wherein both the first and second orientations, the linking portion is configured to be seated on the front wall of the stud.

8. The wiring clip of claim 1, wherein the first arm or the second arm includes a wider portion that forms at least part of the contact portion, adjacent to the linking portion, and a narrower portion from which the biasing tab extend.

9. The wiring clip of claim 8, wherein each of the first arm and the second arm includes a wider portion that forms at least part of the contact portion, adjacent to the linking portion, and a narrower portion from which the biasing tab extends; and
wherein, when the wiring clip is in the first orientation, the wider portion of the first arm is configured to seat on the lip of the stud and, when the wiring clip is in the second orientation, the wider portion of the second arm is configured to seat on the lip of the stud.

10. A clip for securing one or more conductors to a stud comprising:
a support portion; and
an attachment portion that is integrally formed with the support portion and at least partly defines an inner recess that is configured to receive the stud, to secure the clip to the stud without the use of separate fasteners;
the attachment portion including:
a connection portion extending from the support portion;
a linking portion;
a first arm that extends from the linking portion at least partly along the connection portion, the first arm including a first-arm hook with a free end that extends towards the linking portion within the inner recess; and
a second arm that extends from the linking portion opposite the first arm and includes a second-arm hook with a free end that extends towards the linking portion within the inner recess; and
the attachment portion being configured to engage the stud in first and second orientations, with the first-arm hook extending into an open side of the stud behind a lip of the stud and the second-arm hook engaging a side wall of the stud in the first orientation, and with the second-arm hook extending into the open side of the stud behind the lip and the first-arm hook engaging the side wall of the stud in the second orientation.

11. The clip of claim 10, wherein the first arm includes two first-arm hooks.

12. The clip of claim 11, wherein the two first-arm hooks are supported on first-arm biasing tabs that extend into the inner recess.

13. The clip of claim 12, wherein the second arm includes two second-arm biasing tabs that extend into the inner recess to support two second-arm hooks.

14. The clip of claim 10, wherein the first-arm hook is supported on a first-arm biasing tab that extends away from a first-arm stem into the inner recess.

15. The clip of claim 14, wherein the first-arm biasing tab is configured to biasingly engage the side wall of the stud to secure the second arm in engagement with an outer side of the lip of the stud when the attachment portion is in the second orientation.

16. The clip of claim 10, wherein the first arm includes a first-arm stem that supports the first-arm hook and extends between support members of the connection portion, the support members extending along a first side of the inner recess between the linking portion and the support portion.

17. The clip of claim 16, wherein the first arm is formed from a cutout of the connection portion; and
wherein the cutout at least partially defines the support members.

18. The clip of claim 10, further comprising a bendable strap and a locking tab to secure the one or more conductors to the clip.

19. A method of securing one or more wires to a stud using a wiring clip, the method comprising:
inserting a front wall of the stud into an inner recess of the wiring clip by angling the wiring clip relative to the stud to selectively insert either one of a first-arm hook on a first arm of a wiring clip or a second-arm hook on a second arm of the wiring clip past a lip of the stud into an open side of the stud;
urging the wiring clip towards the stud, while maintaining the first-arm hook or the second-arm hook past the lip within the open side of the stud, to:

further move the front wall of the stud into the inner recess; and engage either one of the second arm or the first arm, respectively, with a side wall of the stud to urge the first arm or the second arm, respectively, into an exterior surface of the lip of the stud and thereby secure the wiring clip to the stud without separate fasteners; and securing the one or more wires to the wiring clip using a wire-support portion.

20. The method of claim 19, further comprising:

seating a wider portion of the first arm or the second arm on an exterior surface of the lip, with a narrower extension of the first arm or the second arm that supports the first-arm hook or the second-arm hook extending away from the front wall of the stud past the lip.

\* \* \* \* \*